Nov. 23, 1954  M. ROY  2,694,897
TURBOJET POWER PLANT WITH BRAKING AUXILIARY JETS
Filed Nov. 17, 1950
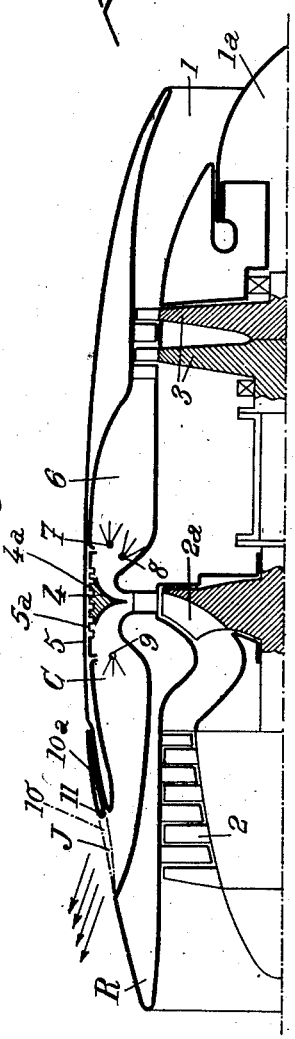
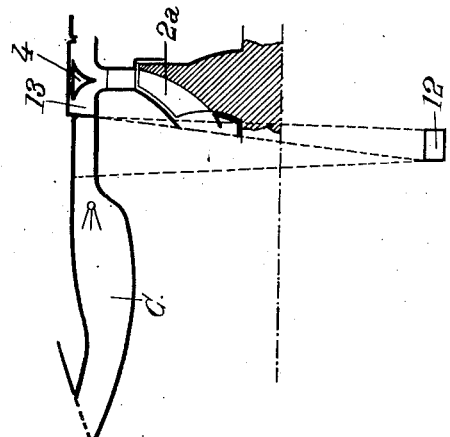
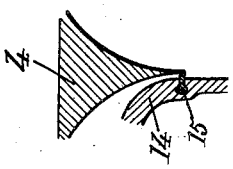
INVENTOR
MAURICE ROY
BY
ATTORNEYS

United States Patent Office 2,694,897
Patented Nov. 23, 1954

2,694,897

TURBOJET POWER PLANT WITH BRAKING AUXILIARY JETS

Maurice Roy, Paris, France, assignor to "Office National d'Etudes et de Recherches Aeronautiques" (O. N. E. R. A.), Chatillon-sous-Bagneux (Seine), France, a society of France Application November 17, 1950, Serial No. 196,243

Claims priority, application France November 21, 1949

2 Claims. (Cl. 60—35.6)

The present invention relates to aircrafts propelled, at least in normal operation, by one or several turbo-jet units.

My invention is concerned with all kinds of turbo-jet units, either of the single stream or of the double stream type, that is to say either without or with dilution of the primary air and fuel stream by a secondary pure air stream which may be more or less compressed, and either of the axial compressor or the centrifugal compressor type or again of the combined axial and centrifugal compressor type.

The chief object of my invention is to provide an aircraft of the above mentioned kind which is better adapted to meet the requirements of practice than those existing at the present time and in particular which can efficiently make use of a portion of the energy available in turbo-jet units for braking the aircraft on its landing run and possibly to facilitate maneuvers in flight.

My invention consists chiefly in providing means for temporarily sending a portion of the air supplied by the compressor of the turbo-jet into one or several combustion chambers extending substantially straight from said compressor to at least one frontwardly directed jet nozzle capable of exerting a braking action on the aircraft.

Preferred embodiments of my invention will be hereinafter described with reference to the accompanying drawing, given merely by way of example and in which:

Fig. 1 is an axial half-section of a single stream turbo-jet unit made according to my invention;

Fig. 2 shows a modification of an element of this turbo-jet unit;

Fig. 3 shows a detail of construction for use in a turbo-jet unit according to my invention.

The aircraft proper is of any suitable construction. It is fitted with at least one turbo-jet unit R capable of supplying (at least in normal flying conditions) the propulsive thrust through the action of a jet nozzle in the conventional fashion.

According to my invention, I send, when necessary, a portion of the compressed air flowing through jet unit R (for instance a portion of the air stream in the case of a single stream unit or the whole of the secondary stream in the case of a double stream unit) into one or several combustion chambers C, called "braking combustion chambers" and opening into frontwardly directed jet nozzles J.

In the case of a single stream turbo-jet unit, it will be advantageous, in order to bring to a maximum the flow of air diverted toward the braking combustion chambers, to increase the pressure drop across the turbine or turbines serving to drive the compressor or compressors, by varying the outlet cross section of the propelling jet nozzle, which can be done through any known means such as a cone of adjustable longitudinal position placed in the converging end portion of said propelling jet nozzle.

In this case, I may inject water into the propulsion combustion chambers so as to compensate for the reduction in the rate of flow of gases through these chambers due to the fact that a portion of the air normally fed thereto is sent to the braking combustion chambers.

In the case of a turbo-jet of the dilution type, the fact of diverting the secondary air stream toward the braking combustion chambers does not modify the rate of flow through the turbine, but the adjusting means (cone slidable in the converging propulsion nozzle) remain useful to adapt the section of flow through said nozzle to the reduced flow that takes place therethrough.

Of course, the proportion of air diverted into the braking combustion chambers must be such that the jet issuing through the rearwardly directed nozzles is at a sufficiently low velocity to supply but a small propulsive thrust, whereby the braking thrust supplied by the frontward jets will greatly exceed this reduced propulsive thrust.

By way of example, the total braking thrust may be made equal to about 50–80% of the maximum propulsive thrust available on taking off. Thus the landing run of the aircraft will be considerably reduced, which is particularly advantageous on an airplane carrier.

In the embodiment of my invention illustrated by the drawings, the turbo-jet is of the single stream type and includes a propulsive jet nozzle 1 (with its inner cone 1a) and two compressors 2 and 2a, the first one being a low pressure axial compressor and the other a high pressure centrifugal compressor.

Both of these compressors are mounted on the same shaft driven by a two-stage turbine 3. The air stream delivered by centrifugal compressor 2a can be divided into two distinct streams by a sliding valve member 4 in the form of a body of revolution having an inward circular ridge and mounted slidable longitudinally in the cowling 5 of the turbo-jet unit. The position of member 4 is controlled by the pilot through any suitable means, either mechanically or by means of a servo-motor.

The air stream which is sent by valve member 4 toward the rear flows through annular combustion chamber 6 fitted with fuel injectors 7 and water atomizers 8. The resulting gaseous stream then passes through turbine 3 into jet nozzle 1 where the ogive-shaped exhaust cone 1a is mounted slidably coaxially with nozzle 1. To move this exhaust cone 1a, it is provided with a rack 20 meshing with a pinion 21 carried by a spindle 22 journalled in the engine frame and driven for instance through a worm and worm wheel.

The air stream diverted by member 4 toward the front passes into combustion chambers C fitted with fuel injectors 9. The resulting gas stream is discharged frontwardly through jet nozzles J, the outlet orifice of each of which is normally stopped by a flap 10 movable about an axis 11 protected against the gaseous stream, said flap 10 being applied at 10a against the cowling when the braking nozzle is in service.

Nozzles J are frontwardly directed to exert the desired braking action, the expression "frontwardly directed" meaning that the velocity of the jet issuing through each of these nozzles has a component parallel to the fore-and-aft axis of the aircraft which is in the same direction as the velocity of the aircraft itself. These nozzles should be so disposed that the jets issuing therefrom do not reduce visibility for the pilot, that no part of the aircraft is caused to flow through gases at high temperature and that the air intakes of the turbo-jet unit do not risk taking in too great an amount of hot gases or air heated by these gases. To achieve a good frontward visibility, the jets from these nozzles should of course diverge laterally and preferably upwardly. Thus they also contribute in applying the aircraft against the ground when landing, without risks of projecting flames or smoke toward the ground.

If the braking jets are ejected on either side of the aircraft, the distance of their axes from the center of gravity must be small in order to reduce to a minimum any dissymmetry in the production of braking thrusts.

In order to concentrate the braking jets in the upper zone of the front part of the turbo-jet unit, it is advantageous to make use of the arrangement shown by Fig. 2. In this construction, all the braking combustion chambers C are located in this zone and the air diverted at 13 from the output of compressor 2a is fed to these chambers C through a scroll 12 running over the whole periphery of said compressor.

The axial displacement of tore-shaped valve member 4 (Figs 1 and 2) may be obtained, for instance by providing the outer wall of this member with screw threads 4a cooperating with corresponding threads 5a provided on the inner wall of cowling 5. It will then suffice to rotate member 4 about the axis of the turbo-jet unit to obtain the desired axial displacement of said member.

When the turbo-jet unit is being used exclusively for propelling purposes, means should preferably be provided to prevent any air stream from flowing through braking combustion chambers C. For instance, as shown by Fig. 3, valve 4 in its front position should bear in a gas-tight fashion against the front wall 14 of the delivery conduit of the compressor. An elastic ring 15 is advantageously carried by this wall 14 to cooperate with member 4.

Advantageously, flaps 10, in their closed position must apply in a fluidtight fashion against cowling 5. To this effect, for instance, their edge is made thin so as to be elastically deformed when strongly applied against said cowling.

In a general manner, one of the most important advantages of the arrangement according to my invention is that the braking combustion chambers are arranged to achieve a high braking thrust without loss of pressure and injury to mechanical parts.

Another advantage of my invention is that a wide choice is possible for locating the braking combustion chambers provided that they extend substantially straight from the air compressor outlet to the inlets of the braking jet nozzles.

It will be readily understood that the presence of the braking combustion chambers and nozzles does not modify the normal flying conditions of the aircraft which is then propelled in the usual manner by turbo-jet R.

Furthermore, it is always possible to shift from braking operation to propelling operation, for instance if, for any reason, it becomes apparent at the last moment that landing is not possible. This shifting from one operation to the other does not require a fresh starting of jet nozzles. As a matter of fact, it will correspond to cutting off the braking combustion chambers and accelerating the rotor, the operation of which was not much modified by the braking operation and can therefore very quickly restore the maximum thrust of the turbo-jet.

It should further be noted that the means to be provided for diverting a compressed air stream toward the braking combustion chambers may be used also for feeding, for instance on taking off, the conventional lift increase and/or boundary layer blowing devices.

It is also pointed out that the braking action of jets J may be advantageously used not only when landing but also when flying to vary the speed of the aircraft and the minimum possible radius of curvature of its trajectory (which radius depends upon this speed). Finally, the projection toward the front of jets of flame may constitute, in flight, a way of attacking some objectives.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A turbo-jet power plant which comprises, in combination, a rear gas turbine, an air compressor coupled with said turbine disposed ahead thereof, said air compressor having a frontwardly facing air intake the axis of which is in line with said turbine, a main jet nozzle having its outlet directed rearwardly and having its inlet connected with the output of said turbine, means forming at least one main combustion chamber having its outlet connected with the intake of said turbine, means for feeding fuel to said combustion chamber, at least one braking jet nozzle extending in a generally frontward direction slightly divergent from the axis of said air intake, at least one auxiliary combustion chamber forming a conduit extending substantially straight from the outlet of said air compressor to the inlet of said braking jet nozzle and in line with said last mentioned nozzle, means for feeding fuel to said auxiliary combustion chamber, and adjustable valve means for distributing the compressed air stream from the outlet of said compressor between the inlets of said two combustion chambers.

2. A power plant according to claim 1 in which said main combustion chamber also forms a conduit extending substantially straight from the outlet of said compressor to the inlet of said turbine, the annular outlet of said compressor being in a plane perpendicular to the common axis of said turbine and said compressor, and said two straight conduits extending on opposed sides of said outlet substantially symmetrically to each other with respect to said plane.

References Cited in the file of this patent

UNITED STATES PATENTS

| Number | Name | Date |
|---|---|---|
| 1,008,912 | Holroyd | Nov. 14, 1911 |
| 2,435,836 | Johnson | Feb. 10, 1948 |
| 2,510,506 | Lindhagen et al. | June 6, 1950 |
| 2,516,671 | Bowers et al. | July 25, 1950 |
| 2,527,732 | Imbert | Oct. 31, 1950 |

FOREIGN PATENTS

| Number | Country | Date |
|---|---|---|
| 622,627 | Great Britain | May 4, 1949 |